Sept. 12, 1933.  W. H. NICHOLSON  1,926,629
MOTOR VEHICLE HEATER
Filed July 7, 1931  2 Sheets-Sheet 2
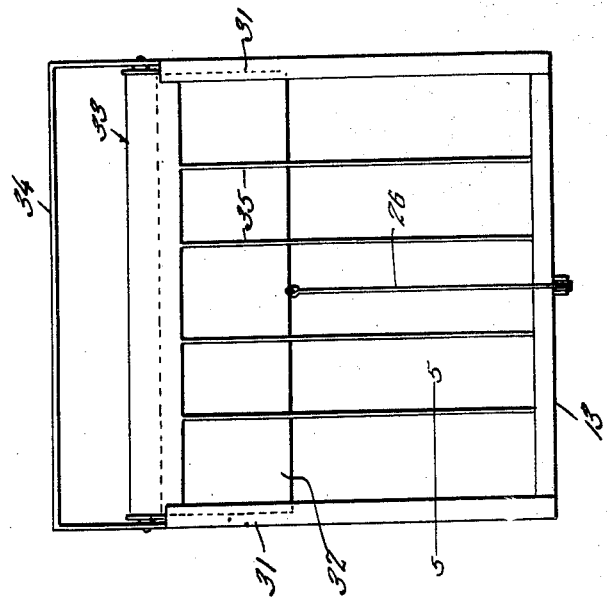
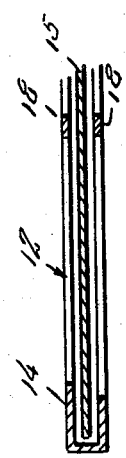
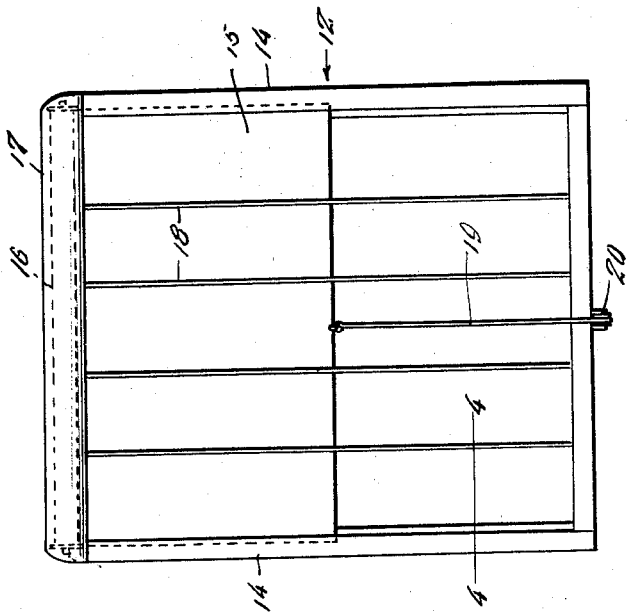
Inventor
Willis H. Nicholson
By Clarence A. O'Brien
Attorney Patented Sept. 12, 1933

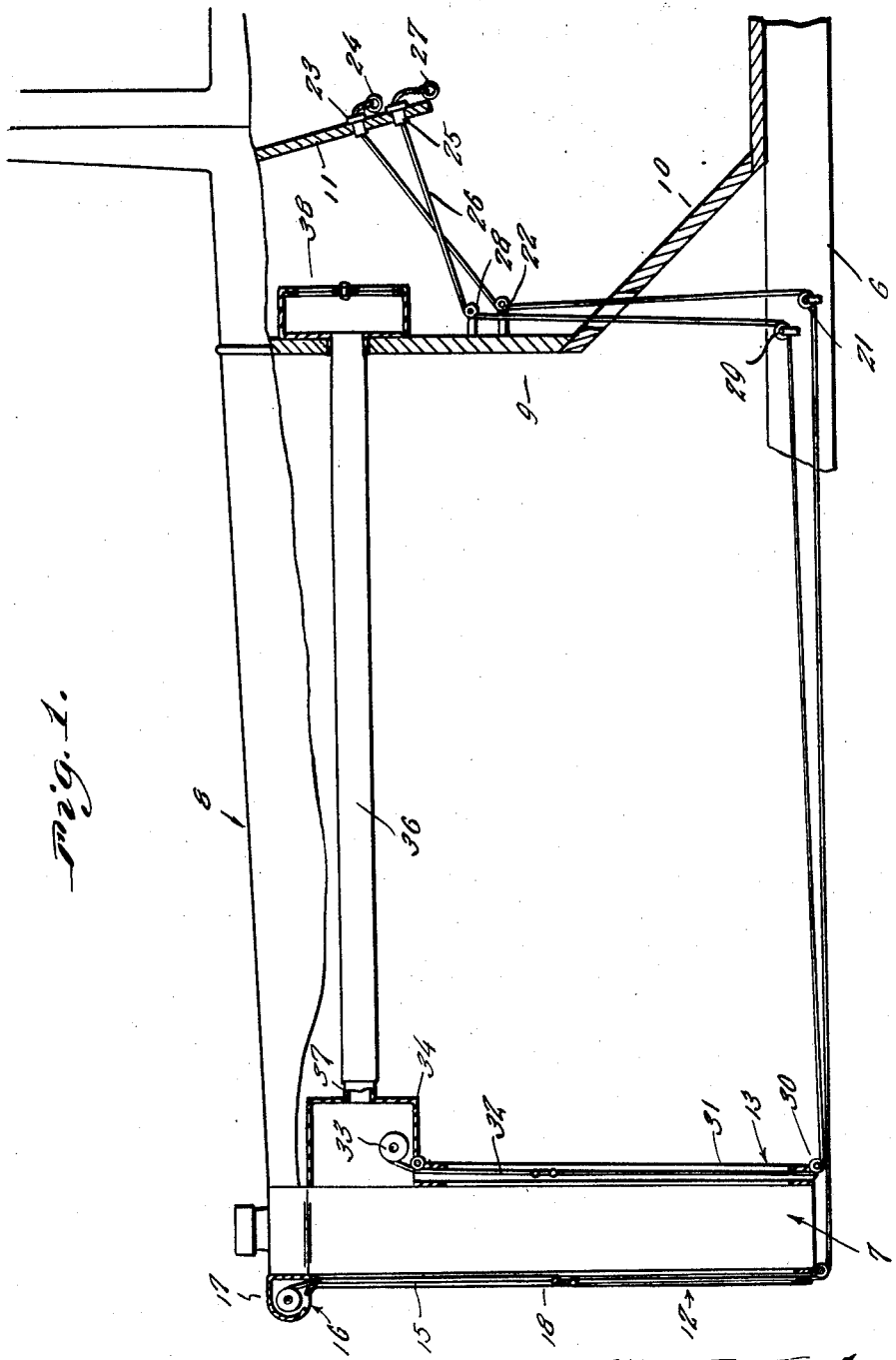

1,926,629

UNITED STATES PATENT OFFICE 1,926,629

MOTOR VEHICLE HEATER

Willis H. Nicholson, Anacortes, Wash.

Application July 7, 1931. Serial No. 549,240

3 Claims. (Cl. 237—12.3)

This invention relates to an improved mechanical manually regulated heater adapted for installation in present day motor vehicles, and it has more specific reference to what is known as a hot air heater.

My primary aim is to generally improve upon known prior art devices by providing a structure which is susceptible of incorporation in present day motor vehicle structures without requiring extensive alterations of the stock parts, the selection and organization of parts being such as to provide an arrangement which is efficient in performance and susceptible of fulfilling the requirements of a structure of this class in a highly satisfactory manner.

More explicitly related, I have endeavored to provide a heater mechanism which is positive and dependable in action, smooth and quiet in operation, economical, practical, and commercially eligible as a competitive structure in the trade.

Other objects and advantages will become more readily apparent from the following description and drawings.

In the drawings:

Figure 1 is a view in section and elevation showing the heater installed.

Figure 2 is a front elevation of the external or frontal part of the structure,

Figure 3 is a similar elevational view of an inner part of the structure.

Figures 4 and 5 are sections on the lines 4—4 and 5—5 respectively of Figures 2 and 3.

In the drawings, in Figure 1, the numeral 6 designates a frame bar of the automobile chassis, 7 indicates a conventional water cooling radiator, 8 the hood, 9 the dashboard, 10 the floorboard and 11 the instrument board. These are all conventional parts.

The forward portion of the structure is made up of two frames 12 and 13, the frame 12 being on the front of the radiator 7 and the frame 13 on the inner side thereof. The frame structure 12 as seen in Figure 2 comprises a pair of vertical guides or channels 14 to accommodate the adjacent edge portion of the curtain 15. The curtain is of appropriate material and wound on a spring actuated shade roller 16 which is housed in a protective casing 17 formed on the upper portion of the frame structure. The numerals 18 in Figure 2 designate grid-forming rods which constitute guards to facilitate working of the curtain.

Attached to the curtain is an operating cable 19 trained over a guide pulley 20 on the bottom of the frame and extending rearwardly and trained over a similar guide pulley 21 on the frame bar 6. There is a similar guide at 22 on the dashboard over which the cable passes and a sleeve-like keeper 23 mounted in the instrument board. The free end of the cable passes through this and is provided with an operating ring 24 and suitable retaining means (not shown).

The numeral 25 designates a similar sleeve through which the cable 26 passes. This cable 26 is also formed with a finger ring 27 and is passed over guides 28 and 29. In addition, there is a guide at 30 mounted in the lower part of the concealed frame structure 13. This structure as shown in Figure 3 includes vertical guides 31 to accommodate the edge portion of the inner curtain 32.

This curtain has a pull cable 26 attached thereto and it is wound on a spring roller 33 journalled for rotation in the upper casing head 34 of the frame structure 13. This frame structure 13 is also formed with protective guard rods 35.

The numeral 36 in Figure 1 designates a heated air conveying conduit which is attached at its front end to a nipple 37 on the heated air trapping casing 34. This conduit is suitably arranged to extend through an aperture in the dashboard and is provided on its rear end with a shutter controlled register 38 to regulate the discharge of the heated air into the body portion of the automobile.

In operation, the inner and outer curtains 32 and 15 respectively are selectively adjusted through the medium of the operating cables 19 and 26. In practice it has been found desirable to draw the outer curtain down about half way so as to allow the desired influx of atmospheric air. This air coming into contact with the radiator is heated and it mingles with the heated air around the motor and is trapped between the two curtains. The inner curtain 32 is drawn down generally to a point lower than the outer curtain to serve as a baffle. It is between these two curtains that the air is trapped and the air naturally rises where it is further trapped and accumulated in the casing 34. From the casing 34 it is conveyed through the tubular conduit 36 and out through the register 38 into the tonneau of the automobile.

The curtains are on conventional spring wound rollers and are therefore susceptible of being lowered and elevated at the discretion of the operator of the car. Consequently the air trapping operation can be systematically controlled.

The gist of the invention is to provide inner and outer curtains relatively adjustable with operating means, mountings or frames for these curtains and some sort of means for conveying the heated air from the space between the curtains into the body portion of the car.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structure of the class described, in combination, a motor vehicle including a body, a cooling system radiator, an externally disposed curtain co-operable with the exposed front face of the radiator, a concealed curtain co-operable with the rear face of the radiator, said curtains being adjustable with respect to each other to serve as means for trapping air to be heated by the radiator, a valved conduit for conveying the heated air from the radiator into the body of the automobile, and means operable from the interior of the automobile body for adjusting said curtains.

2. In a structural arrangement of the class described, in combination, an automobile body, a cooling system radiator, an outside front curtain, means for mounting said curtain to co-operate with the front side of the radiator, a concealed inside curtain, means for mounting said inside curtain to co-operate with the inner face of the radiator, said curtains being adjustable with respect to each other for trapping air therebetween, a conduit attached to the inner curtain mounting and having its rear end communicating with the exterior of the automobile body, a shutter equipped register carried by the rear end of said conduit, and individually operable control cables connected with said curtains, said cables having their inner operating ends located adjacent the instrument board for convenient manipulation by the operator of the automobile.

3. In a structure of the class described, in combination, a motor vehicle structure including a body, an instrument board, a dash board, a radiator, and an adjacent hood associated with the radiator, a frame structure attached to the exterior front side of the radiator and including vertical guides and a top curtain housing, a spring roller curtain arranged in said housing and having its side edge portions engaging said guides, an inner frame structure attached to the inner face of the radiator and concealed beneath said hood and including vertical guides and an enlarged open front top casing, a second spring-wound curtain mounted in said top casing and having its edge portions movable in the vertical guides of the frame structure, a valved conduit attached to said second casing and extending through the dashboard, separately operable control cables attached to the curtains passing over suitable guides and having operating and control means associated with the instrument board.

WILLIS H. NICHOLSON.